United States Patent Office 3,457,817
Patented July 29, 1969

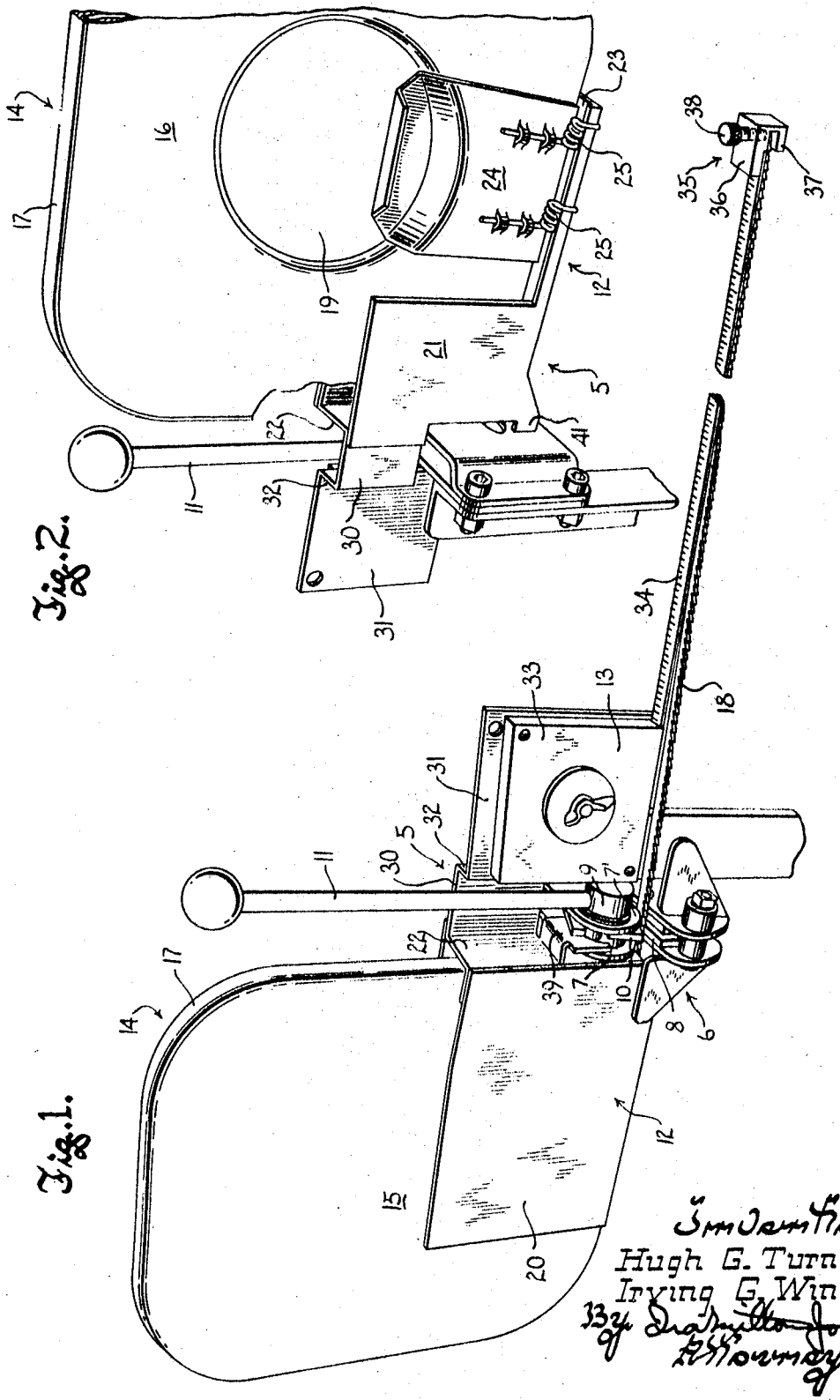

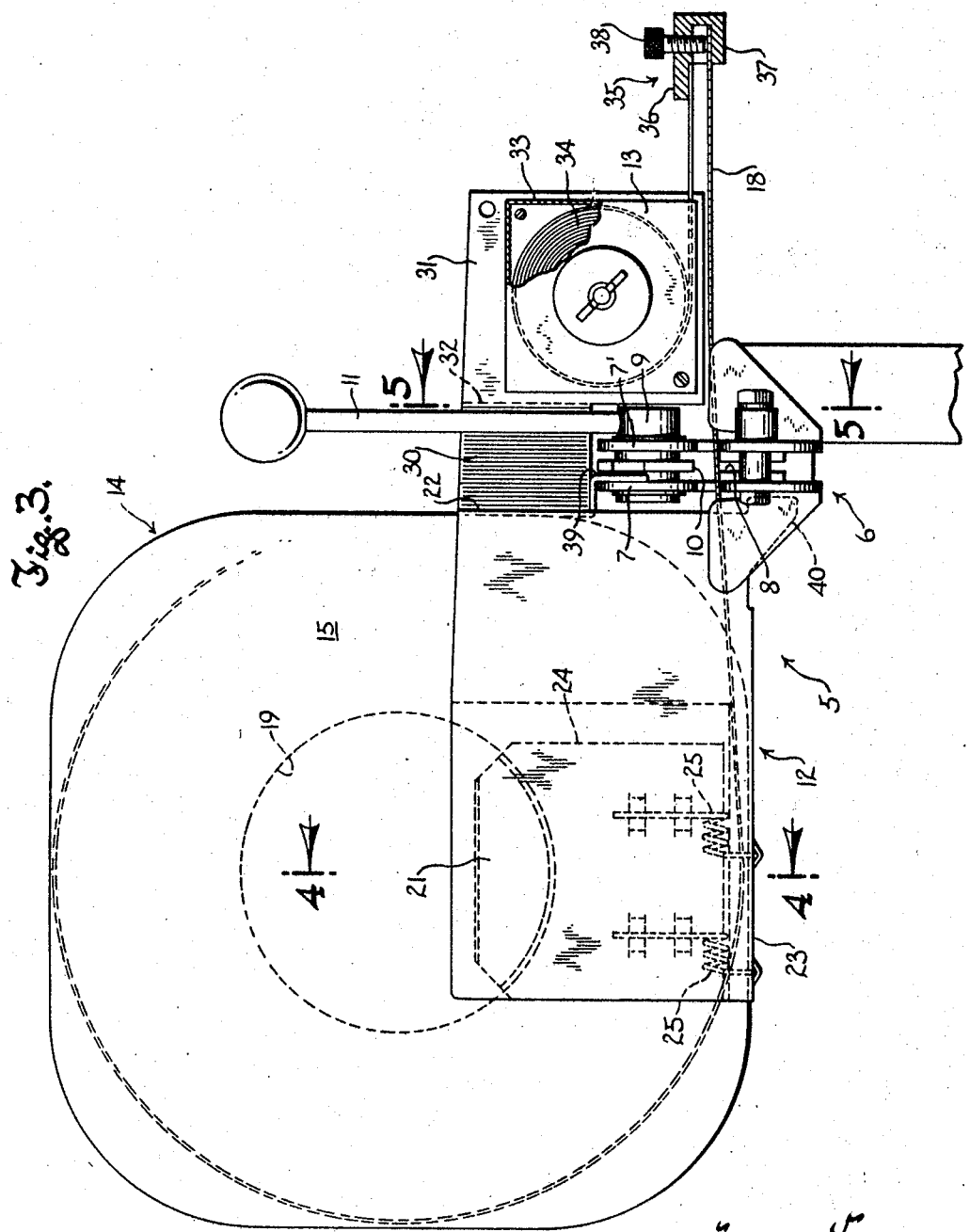

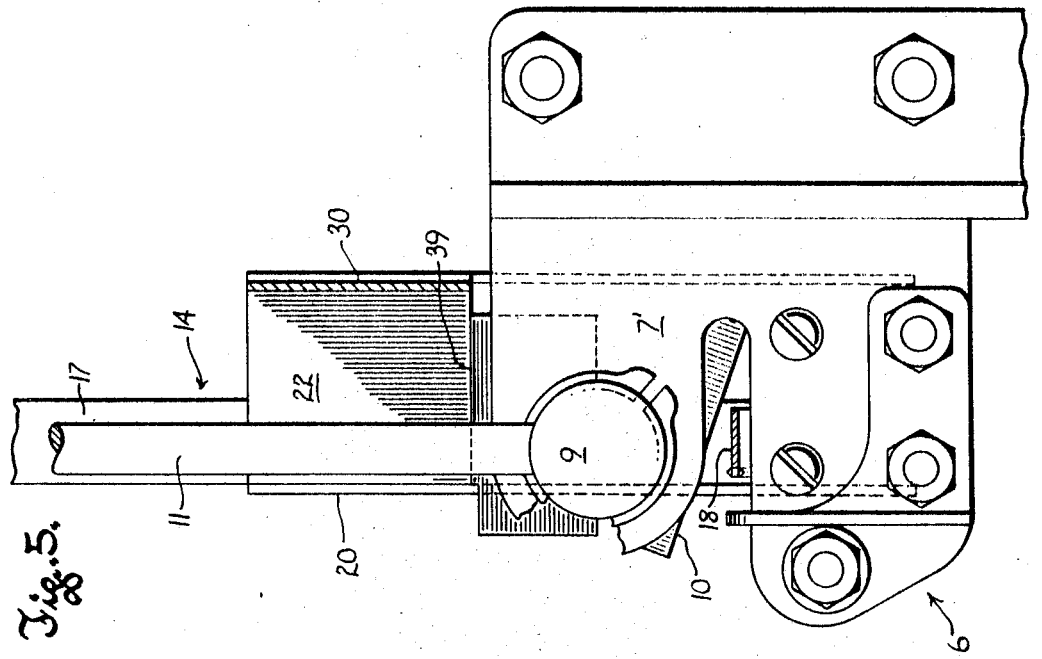
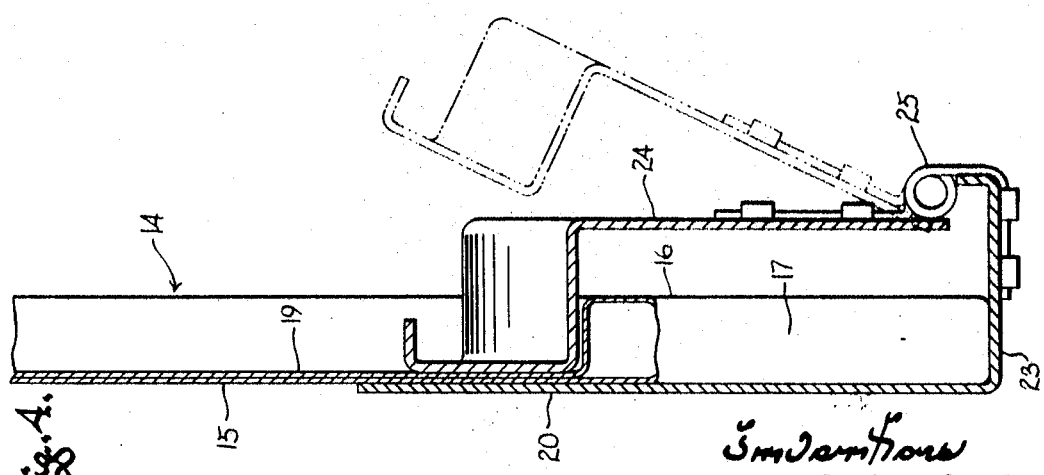

3,457,817
MEANS FOR CUTTING PREDETERMINED LENGTHS OF BAND STOCK FROM A COIL
Hugh G. Turnbull, Edina, and Irving G. Winer, St. Louis Park, Minn., assignors to Continental Machines, Inc., Savage, Minn., a corporation of Minnesota
Filed Feb. 20, 1967, Ser. No. 617,296
Int. Cl. B26d 7/28
U.S. Cl. 83—522                          2 Claims

ABSTRACT OF THE DISCLOSURE

A trough-like coil carrier secured to a shearing tool at one side thereof releasably but firmly holds a saw band container in such a position that stock drawn from the container passes between the shearing blades of the tool. A tape measure is mounted on a bracket on the coil carrier, at the other side of the shearing tool, and in such position that the measuring tape is drawn out in the direction away from the tool and in parallelism with stock drawn from the container. A clamp on the measuring tape facilitates simultaneous withdrawal of tape and stock.

---

This invention relates to apparatus for measuring and cutting off predetermined lengths of metal band stock from a coil thereof. The invention has particular utility in relation to the preparation of saw bands from blade stock, but has utility, also, in connection with band material of other types.

Band saw blade stock is usually sold in substantially long units, each adequate for a number of saw bands. For convenience in handling and transportation, each unit of saw band is coiled helically and packaged in a suitable container that keeps it coiled. In some cases the container is so arranged that the band stock can be drawn out of the container through a slot in its side wall.

When a saw band is to be made up, a suitable length of the band material is drawn out of the container and severed from the remainder of the coil with a small shear or other cutting tool, and the ends of the severed length are then butt welded together to form an endless saw band ready to be installed on a band machine. In some cases both the shearing tool and the welder are mounted on the bed of the band machine, in a location where they are out of the way of work normally done on the machine.

Heretofore, the withdrawal of a desired length of band stock from a container, for the purpose of making a saw band, has been an awkward and inconvenient procedure. The shearing tool, when mounted on the band machine, was often in a location which offered no resting place for the band stock container, and the operator making the saw band had to juggle the container and an unwieldy length of band stock projecting therefrom, and simultaneously operate the shear or other cutting tool.

As this was being done, it often happened that a substantially excessive amount of band stock was drawn out of the container. It was virtually impossible to get the excess length of band stock back into the container because friction between the walls of the container and the coil of stock inside it greatly inhibited bodily rotation of the coil, and opening up the container so that the coil could be rotated by hand invited the risk of the entire coil of stock popping out of the container and unwinding itself like a freed watch spring. Hence the unsatisfactory alternatives were to cut off the excess stock near the container and discard it, or to store the container with a relatively long stretch of band stock dangling from it.

The problem just described has existed during a period of substantially over a quarter of a century, during which time band machines have been in very widespread use. Recently the problem was overcome in part by providing means on band stock containers for rewinding any excess of stock that had been drawn out. But such a rewind container was costly, was no more convenient to use than its predecessors, and did not eliminate the likelihood of withdrawing excessive stock but merely reduced the amount of time that might be wasted in getting it back into the container.

It is the general object of the present invention to provide a direct and complete solution to the above described problem, in the nature of structure associated with a shearing tool and comprising compact and convenient means for releasably supporting a container for coiled strip or band stock in fixed relation to the shearing tool and whereby a desired length of strip can be readily withdrawn from the container, and means for measuring the length of strip withdrawn from the container as it is being drawn out, so that there is no likelihood of excessive stock being withdrawn.

Another object of this invention is to provide convenient and compact apparatus for enabling a predetermined length of band or strip stock, such as saw blade band, to be unreeled and cut off from a coil thereof, which apparatus is adapted to be readily detachably mounted on a conventional shearing tool such as is provided on many band machines.

It is also an object of this invention to provide structure of the character described which is well adapted for cooperation with a generally conventional rewind-type tape measure comprising a flexible measuring tape, a holder in which the tape is normally coiled, and rewind means in the holder for drawing back thereinto a length of measuring tape that has been withdrawn therefrom.

A further object of this invention is to provide structure of the above described character whereby the measuring tape of a rewind-type tape measure is constrained to be withdrawn from its holder concomitantly and in parallelism with a strip of band stock that is being withdrawn from a coil thereof in a container, so that the length of stock that has been withdrawn from the container can be read directly from the exposed measuring tape.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of a physical embodiment of the invention constructed according to the best mode so far devised for the practical application of the principles thereof, and in which:

FIGURE 1 is a front perspective view of apparatus embodying the principles of the present invention;

FIGURE 2 is a rear perspective view of the apparatus shown in FIGURE 1;

FIGURE 3 is a view in front elevation of the apparatus shown in FIGURE 1, with a portion of the tape measure holder broken away;

FIGURE 4 is an enlarged sectional view taken on the plane of the line 4—4 in FIGURE 3; and FIGURE 5 is an enlarged sectional view taken on the plane of the line 5—5 in FIGURE 3.

Referring now to the accompanying drawings, the numeral 5 designates generally the apparatus of this invention, which is adapted to be readily removably mounted on a band shearing tool 6 such as is often affixed to a band machine (not shown) at a location on the machine where it is out of the way of material in the work performing zone. The shearing tool 6, which is conventional, comprises, in general, a pair of spaced, upright supporting members 7 and 7' upon which a fixed shearing blade 8 is mounted and which cooperate to journal a short, sturdy rotatable shaft 9 that carries a movable shearing blade 10. By means of a manually swingable lever 11 that projects radially from one end of the shaft 9, outwardly of the supporting members, the shaft can be rotated to bring the movable blade 10 into cooperating shearing relationship with the fixed blade 8.

The apparatus of this invention, which is adapted to be readily hooked onto and removed from the shearing tool, comprises, in general, a coil carrier 12 at one side of the shearing tool for releasably holding a coil of band stock, a recoil-type tape measure 13 which is located at the opposite side of the shearing tool, and a bracket 30 which bridges the shearing tool and supports the coil carrier 12 and the tape measure 13 in a predetermined relationship to one another and to the shearing tool.

As the description proceeds it will be apparent that a coil of band or strip stock secured in the coil carrier 12 need not be housed in any particular type of container, so long as it is confined by some suitable means which keeps it from unwinding uncontrolledly, but the coil carrier is particularly adapted to receive a saw band container 14 of a well-known type comprising large end walls 15 and 16 that overlie the ends of a coil of band stock 18 within the container, and a narrow peripheral side wall 17 that confines the coil of stock against unwinding. Stock can be drawn lengthwise out of the container through a small slot in its side wall 17, from which a short "leader" of the stock normally projects to facilitate such withdrawal. One end wall 16 of the container is formed with a substantially deep dimple or inwardly projecting boss 19 that provides a core for the coil of band stock within the container.

The coil carrier structure defines a sort of trough that opens upwardly and sidewardly to receive a container 14, and comprises an upright front wall 20, which can be flat, a shorter upright rear wall 21, an upright end wall 22 adjacent to the shearing tool, and a bottom wall 23, all of which can be formed integrally with one another as parts of a unitary blank of sheet metal.

The container 14 is receivable in the coil carrier with its flat end wall 15 flatwise engaging the upright front wall 20, with portions of its side wall 17 engaging the end wall 22 and bottom wall 23, and with the slot through which the "leader" projects opening toward the shearing tool beneath the end wall 22. To releasably confine the container in this position, the coil carrier also includes a clamping element 24 that is hingedly connected to the bottom wall 23 and flatwise biased toward the front wall 20 by torsion spring means 25.

The torsion spring means 25 is illustrated as comprising a pair of coiled springs, each having an arm 26 that is secured to the bottom wall 23 and an arm 27 that is secured to the clamping element 24. The clamping element is mounted adjacent to the rear wall 21, near the edge thereof remote from the shearing tool, and is formed at its top with an arcuate boss portion 28 that engages rather snugly in the boss or dimple 19 in the container. The clamping element can of course be drawn away from the front wall 20 of the coil carrier against the bias of the torsion springs 25 and to the position illustrated in broken lines in FIGURE 4, to enable a container to be inserted into and removed from the coil carrier.

Bent laterally out of the plane of the end wall 22 of the coil carrier and projecting therefrom across the shearing tool is a bracket 30 that is substantially coplanar with the rear wall 21, so as to be spaced slightly behind the shearing tool lever 11 when the latter is in its normal upright position. At the side of the shearing tool remote from the coil carrier this bracket is enlarged, as at 31, to provide a mounting for the recoil-type tape measure 13, and this enlarged portion of the bracket is forwardly offset to some extent with respect to the bracket portion that is directly over the shearing tool, the offset being designated by the numeral 32.

The tape measure comprises a holder or housing 33 having opposite flat sides and within which a measuring tape 34 is normally coiled, with its end portion projecting slightly from the holder through a slot therein. The tape 34 is of course connected with a recoil spring (not shown) in the holder by which the tape is drawn back into the holder when released after having been pulled out.

The tape measure is so mounted on the bracket portion 31 that the slot in its holder 33 is near the bottom thereof and only slightly above the level of the slot in a band stock container 14 resting on the bottom wall 23 of the coil holder 12. Furthermore, the slot in the tape measure holder is at the side thereof that is remote from the shearing tool, so that the measuring tape can be withdrawn from its holder concurrently and in parallelism with withdrawal of band stock from the coil holder 12, and with the measuring tape on top of the band stock so as to be readily visible. The offset 32 in the bracket 30 of course insures that the measuring tape will be lengthwise aligned with band stock withdrawn from a container in the coil holder 12, while affording adequate clearance between the shearing tool handle 11 and the narrow portion of the bracket that is behind said handle.

To facilitate simultaneous withdrawal of measuring tape and band stock, there can be secured to the free end of the measuring tape a substantially U-shaped clamp 35 having an upper leg 36 that overlies the upper surface of the tape, a lower leg 37 that extends beneath the end portion of the tape at a distance below the same, and a screw 38 threaded through the upper leg and adapted to cooperate with the lower leg in releasably clamping an end portion of band stock, as illustrated in FIGURE 3.

It will be apparent that in using the apparatus, band stock 18 is withdrawn from a container 14 on the coil carrier 12 the small distance necessary to have its free end received in the clamp 35, whereupon the screw 38 is tightened. It is then an easy matter to withdraw measuring tape and band stock simultaneously until the exposed tape shows that exactly the desired length of band has been withdrawn, whereupon the shear can be actuated to sever the desired length of band stock from the remainder of the coil thereof, leaving only a small "leader" of band stock projecting from the container. The clamp 35 is then loosened, the measuring tape is permitted to rewind into its holder, and the ends of the severed length of band stock can be welded together or the band stock can be otherwise used.

For convenience in using the apparatus the end portion of the measuring tape 34 can be cut off by an amount equal to the distance between the shearing blades of the shearing tool and the slotted wall of the measuring tape holder, so that the length of band stock to be severed can be read directly on the measuring tape without the need for applying any correction factor.

For convenience, the measuring and dispensing apparatus can be arranged to be readily mounted on and removed from the shearing tool, so that it can be stored in an out-of-the-way loaction. To this end the coil carrier 12 has a bifurcated downwardly projecting and laterally offset extension 39 of its end wal 22 that hooks over the upright member 7 of the shearing tool and straddles the shaft 9, and has feet 40 and 41 that project downwardly and edgewise inwardly from its front wall 20 and rear wall 21, respectively, to abuttingly engage the upright 7 of the shearing tool. It will be apparent that the heaviest part of the apparatus is the coil carrier, especially when a band stock container is engaged in it, and that consequently the hook and abutment connection just described is maintained effective by the weight of the apparatus. Furthermore, since the feet 40 and 41 face in the direction in which force is exerted on the apparatus as band stock and measuring tape are withdrawn, the apparatus, in use, remains firmly fixed to the shearing tool, although it can be readily removed therefrom by merely lifting the coil carrier to disengage the bifurcated hook 39 from the shearing tool shaft.

From the foregoing description taken with the accompanying drawings it will be readily apparent that this invention provides simple and inexpensive apparatus whereby a predetermined length of strip or band stock can be withdrawn from a coil thereof and conveniently severed from the remainder of the coil, and which thus avoids the waste and inconvenience of withdrawing excessive lengths of stock from the coil.

What is claimed as our invention is:

1. Apparatus for enabling a predetermined length of band stock, such as saw blade band to be withdrawn and cut off from a coil thereof, said apparatus comprising:
(A) a band stock cutter;
(B) coil carrying means operatively associated with the band stock cutter for releasably supporting a coil of band stock near the cutter, at one side of the latter, with the coil so disposed that band stock drawn therefrom extends through the cutter to the opposite side thereof, said coil carrying means comprising
  (1) a fixed upright wall member adapted to flatwise oppose one end surface of a coil of band stock,
  (2) a cooperating clamping member adapted to flatwise oppose the opposite end surface of a coil of band stock,
  (3) means connected between said members for yieldingly flatwise biasing the clamping member toward the wal lmember, and
  (4) boss means on one of said members, projecting toward the other, engageable in the central portion of a coil of band stock to constrain the same to rotation between the members;
(C) a length measuring device of the type comprising
  (1) a measuring tape,
  (2) a holder in which the tape is normally coiled and which has an outlet at one side thereof from which the tape can be withdrawn, and
  (3) recoil means in the holder for winding the tape back into the holder after it is withdrawn therefrom; and
(D) means mounting said measuring tape holder in fixed relation to the coil carrying means, near the cutter and at said opposite side thereof, with said outlet at the side of the holder remote from the coil carrying means so that measuring tape can be drawn from the holder concurrently and in parallelism with band stock drawn from a coil thereof in the coil carrying means, whereby the length of band stock withdrawn from the coil and passed through the cutter will be indicated by the exposed measuring tape.

2. The apparatus of claim 1 wherein the band stock cutter comprises a shearing tool having spaced upright supporting members by which a fixed shearing blade is carried and which cooperate to journal a rotatable shaft that carries a movable shearing blade, and wherein said means mounting the measuring tape holder in fixed relation to the coil carrying means comprises a bracket projecting from the coil carrying means, said apparatus being further characterized by means for detachably securing the coil carrying means and measuring tape holder to the cutter, said last named means comprising:
(A) a hook-like downwardly bifurcated element on the coil carrying means engageable with the shaft of the shearing tool and with the inner surface of one of the supporting members, with its bifurcations straddling the shaft; and
(B) abutment means on the coil carrying means engageable with the outer surface of said one of said upright members at spaced locations beneath the shaft.

References Cited
UNITED STATES PATENTS

| | | | |
|---|---|---|---|
| 244,253 | 7/1881 | Judd | 83—522 X |
| 376,642 | 1/1888 | Dille et al. | 83—522 |
| 2,463,037 | 3/1949 | Holm. | |
| 3,136,192 | 6/1964 | Morceau | 83—522 X |

JAMES M. MEISTER, Primary Examiner

U.S. Cl. X.R.

83—649